(12) United States Patent
Takarada (10) Patent No.: US 9,204,513 B2
(45) Date of Patent: Dec. 1, 2015

(54) CIRCUIT, CONTROL PROGRAM, AND RECORDING MEDIUM

(71) Applicant: Sharp Kabushiki Kaisha, Osaka (JP)

(72) Inventor: Takeshi Takarada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/434,493

(22) PCT Filed: Oct. 2, 2013

(86) PCT No.: PCT/JP2013/076852
§ 371 (c)(1),
(2) Date: Apr. 9, 2015

(87) PCT Pub. No.: WO2014/065091
PCT Pub. Date: May 1, 2014

(65) Prior Publication Data
US 2015/0282271 A1    Oct. 1, 2015

(30) Foreign Application Priority Data

Oct. 22, 2012 (JP) ................................. 2012-233088

(51) Int. Cl.
*H05B 37/02* (2006.01)
*H05B 33/08* (2006.01)

(52) U.S. Cl.
CPC .................. *H05B 33/0848* (2013.01)

(58) Field of Classification Search
CPC ........... H05B 33/0815; H05B 33/0848; H05B 33/0827
USPC .................................................. 315/192, 308
See application file for complete search history.

(56) References Cited

U.S. PATENT DOCUMENTS

| | | | |
|---|---|---|---|
| 2007/0228994 A1* | 10/2007 | Hung | H05B 41/295 315/247 |
| 2010/0109537 A1 | 5/2010 | Nishino et al. | |
| 2012/0074845 A1* | 3/2012 | Aoki | H05B 33/0845 315/119 |
| 2012/0146519 A1* | 6/2012 | Briggs | H05B 33/0857 315/192 |
| 2015/0042229 A1* | 2/2015 | Duan | H05B 33/0815 315/119 |
| 2015/0102726 A1* | 4/2015 | Yoneoka | H05B 33/0848 315/121 |
| 2015/0173133 A1* | 6/2015 | Seki | H05B 33/08 315/185 R |

FOREIGN PATENT DOCUMENTS

| | | |
|---|---|---|
| JP | 2008-130989 A | 6/2008 |
| JP | 2008-300209 A | 12/2008 |

* cited by examiner

*Primary Examiner* — Don Le
(74) *Attorney, Agent, or Firm* — Chen Yoshimura LLP (57) ABSTRACT

An LED driver circuit includes light-element lines, a general purpose LED driving circuit that controls a current value, and current compensation lines respectively connected to the light-element lines. Each of the current compensation lines is provided with a fixed current source and a switch, and the switch switches an open/closed state of the current compensation line.

7 Claims, 4 Drawing Sheets

FIG. 7 of light-element lines connected to each other in parallel.

BACKGROUND ART

In recent years, there is demand for display devices used in the area of industrial appliances (IA) to be safe, economical, and environmentally friendly. Based on this, consideration has been given to using light-emitting diodes (LEDs) as the light source for the backlight in liquid crystal displays (LCDs) in order to improve lifespan compared to conventional devices.

In such applications, a plurality of LEDs are provided in a line with a plurality of such lines being provided, and modularization has taken place in order to be able to simultaneously drive many LEDs.

Figure 6:
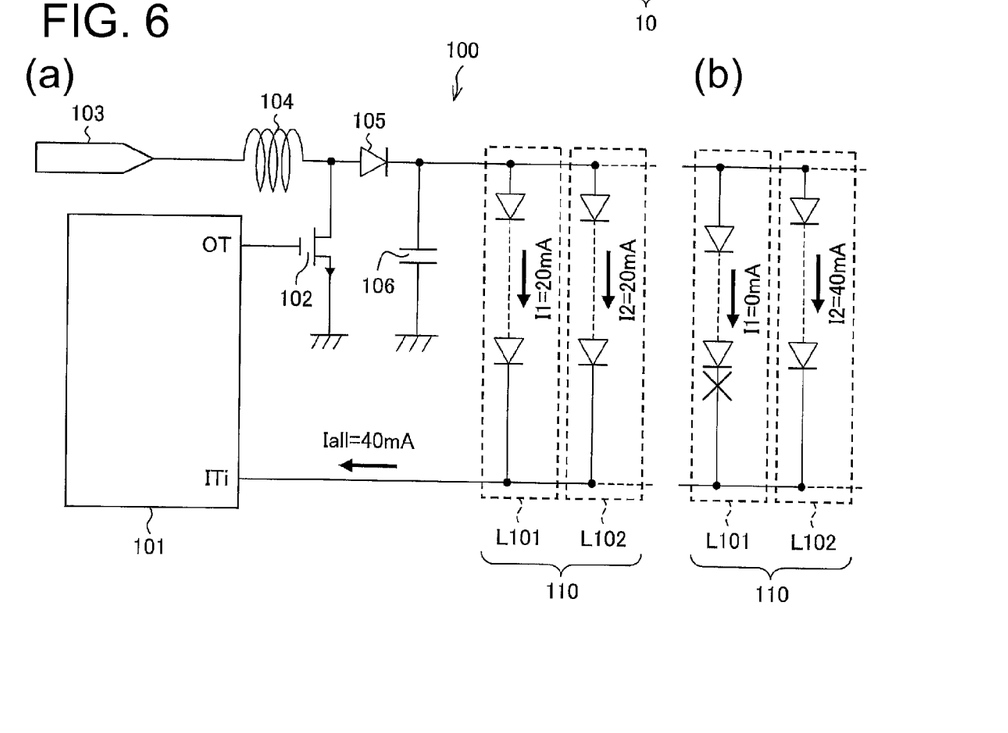
FIG. 6 shows a general configuration of an LED driver circuit.

FIG. 6(a) shows a configuration of a general LED driver circuit 100. As shown in FIG. 6(a), the LED driver circuit 100 includes a light-emitting module 110. The light-emitting module 110 includes light-element lines L101 and L102 in which a plurality of light-emitting elements are provided in a line, and the respective light-element lines are connected to each other in parallel.

The LED driver circuit 100 includes a general use LED driving integrated circuit (IC) 101, a semiconductor switch 102, a voltage source 103, an inductor 104, a diode 105, and a capacitor 106.

The general use LED driving IC 101 is connected to other components through a current input terminal ITi and a control output terminal OT, thereby forming the LED driver circuit 100. By this configuration, the general use LED driving IC 101 controls the value of a current Iall flowing in the LED driver circuit 100 so as to be a fixed value (40 mA). By performing such control, even if the value of the current Iall fluctuates, the value of the current Iall can be kept at the constant rate by the general use LED driving IC 101 opening and closing the semiconductor switch 102. In other words, the LED driver circuit 100 controls a few light-element lines at a time on the cathode side of the diode 105 by controlling the sum of the currents flowing through the light-element lines.

The number of light-element lines, the arrangement, the number of light-emitting elements (LEDs) included in each light-element line, and the like can be changed according to the specifications of the general use LED driving IC (the allowable current value, the maximum number of lines, etc., for example).

However, the LED driver circuit 100 has the following problems.

FIG. 6(b) is a drawing showing the state of the light-emitting module 110 when the light-element line L101 is open. Here, "open" refers to the fact that there is a disconnection in a portion of the light-element line. As shown in FIG. 6(b) if the light-element line L101 is open, no current flows through the light-element line L101. In other words, if the current flowing through the light-element line L101 is I1, the value of the current I1 is 0 mA.

As described above, the value of the current Iall flowing to the LED driver circuit 100 is controlled so as to be a fixed value (40 mA). As a result, if the current flowing through the light-element line L102 is I2, the value of the current I1 is 40 mA. In other words, as shown in FIG. 6(a), if all of the plurality of light-element lines are operating normally, the current I1 and the current I2 are at 20 mA, but if any of the plurality of light-element lines is open, then a current at twice the value is concentrated in the remaining light-element lines.

Thus, in the general LED driver circuit 100, there are concerns such as the current concentrating in the light-element lines and the light-emitting elements being damaged due to the absolute maximum rating of the light-emitting elements included in the light-element lines being exceeded.

The configuration disclosed in Patent Document 1 is an example of a configuration to mitigate such concentration of current in the light-element lines.

Figure 7:
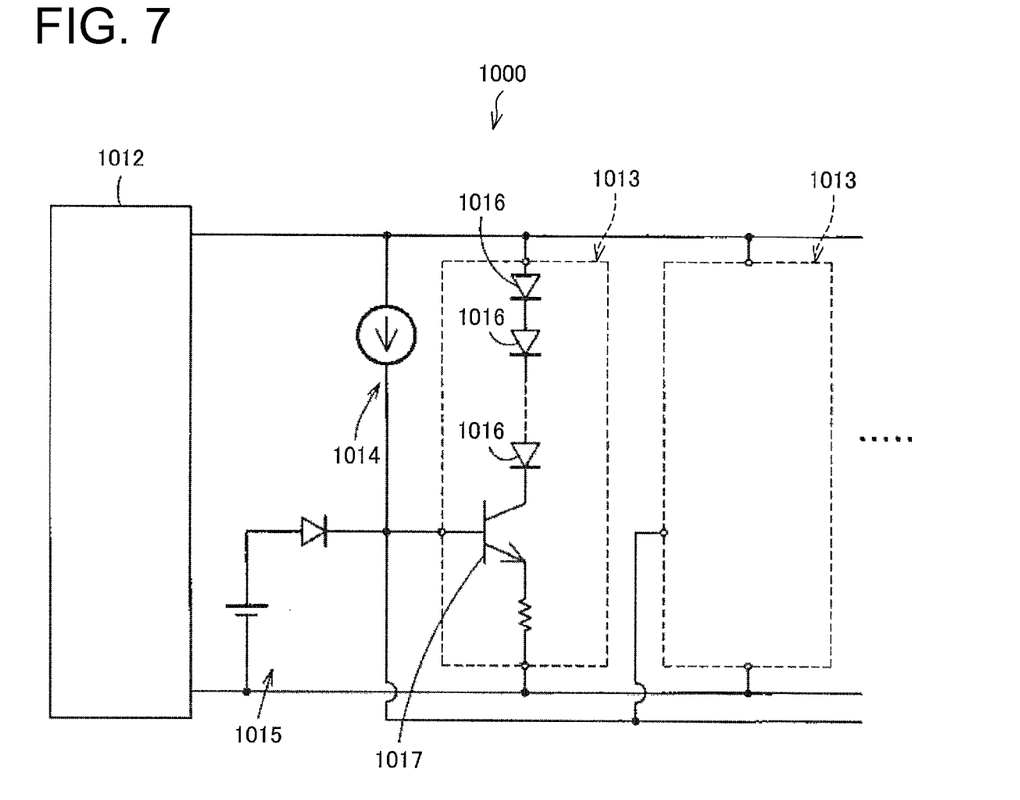
FIG. 7 shows a configuration of an LED driver circuit disclosed in Patent Document 1.

FIG. 7 shows a configuration of the LED driver circuit 1000 disclosed in Patent Document 1. As shown in FIG. 7, in the LED driver circuit 1000, one or more light-element lines 1013 are connected to the output terminal of a fixed current power source supplying a fixed current, the light-element lines 1013 being connected in parallel to each other, and a biasing circuit 1014 is also connected in parallel, a fixed voltage source 1015 being connected to the biasing circuit 1014. The fixed voltage source 1015 causes a base potential of a transistor 1017 to be set at or above a prescribed value. Even if at least one of the LEDs 1016 of the light-element line 1013 became open due to damage or the like, it is possible to prevent a decrease in base potential of the transistors 1017 connected to other light-element lines 1013 using the fixed voltage source 1015, which allows the current at the other light-element lines 1013 to be fixed, and allows the LED driver circuit 1000 to be protected with a simple configuration.

RELATED ART DOCUMENT

Patent Document

Patent Document 1: Japanese Patent Application Laid-Open Publication, "Japanese Patent Application Laid-Open Publication No. 2008-300209 (Published on Dec. 11, 2008)"

SUMMARY OF THE INVENTION

Problems to be Solved by the Invention

However, the LED driver circuit 1000 of Patent Document 1 as described above has the following problems.

The LED driver circuit 1000 has a configuration such that the biasing circuit 1014 is connected to the external fixed current power source 1012, and thus, even if the light-element lines 1013 are not open and therefore operating normally, current always flows, which poses a disadvantage for products for which low power consumption is desired such as battery-driven products and LED backlights.

The present invention takes into account the above-mentioned problem, and provides a low power consumption circuit that can protect light-element lines.

Means for Solving the Problems

In order to solve the above-mentioned problems, a circuit according to one aspect of the present invention includes: a plurality of light-element lines connected to each other in parallel; a current control element that controls a sum of current flowing through the light-element lines so as to be at a constant value; and current compensation lines connected in parallel to the respective light-element lines, wherein each of the light-element lines includes: a light-emitting portion; and a detection unit connected in series to the light-emitting portion and detecting an open/closed state of the light-element line, wherein each of the current compensation lines includes: a fixed current source that, when the light-element line that is coupled to the current compensation line is closed, generates a current at approximately the same value as a current flowing through the light-element line; and a switch that is connected in series to the fixed current source and switches the open/closed state of the current compensation line, wherein the switch closes the current compensation line so that the current compensation line is electrically connected in parallel to the corresponding light-element line coupled thereto when the detection unit of the light-element line detects that the light-element line is open, and opens the current compensation line so as not to be electrically connected in parallel to the light-element line when the light-element line is detected as closed.

Furthermore, a circuit according to another aspect of the present invention includes: a plurality of light-element lines connected to each other in parallel; a current control element that controls a sum of current flowing through the circuit so as to match a variable target value; and a set value providing unit providing a set value to the current control element, wherein each of the light-element lines includes: a light-emitting portion; and a detection unit connected in series to the light-emitting portion and detecting an open/closed state of the light-element line, wherein the set value providing unit generates the set value for each combination of open/closed states of the plurality of light-element lines detected by the detection unit, wherein the current control element generates the target value for each the generated set value, and wherein the generated target value is a value obtained by subtracting, from the value prior to being generated, the sum of current flowing in the light-element lines when the light-element lines previously detected as open are closed.

Moreover, a circuit according to another aspect of the present invention includes: a plurality of light-element lines connected to each other in parallel; a voltage control element that controls a potential difference; and current compensation lines connected in parallel to the respective light-element lines, wherein each of the light-element lines includes: a light-emitting portion; and a detection unit connected in series to the light-emitting portion and detecting an open/closed state of the light-element line, wherein each of the current compensation lines includes: a resistor having approximately the same resistance as the light-emitting portion of the light-element line coupled to the corresponding current compensation line, and a switch that is connected in series to the resistor and switches the open/closed state of the current compensation line, wherein the switch closes the current compensation line so that the current compensation line is electrically connected in parallel to the corresponding light-element line coupled thereto when the detection unit of the light-element line detects that the light-element line is open, and opens the current compensation line so as not to be electrically connected in parallel to the light-element line when the light-element line is detected as closed.

Effects of the Invention

According to one aspect of the present invention, an effect is achieved allowing a low power consumption circuit that can protect light-element lines to be provided.

BRIEF DESCRIPTION OF THE DRAWINGS

FIG. 6(a) shows a case in which all light-element lines are operating normally, and FIG. 6(b) shows a case in which one of the light-element lines is not operating normally.

DETAILED DESCRIPTION OF EMBODIMENTS

Below, an embodiment of the present invention will be explained in detail.

Embodiment 1

One embodiment according to the present invention is as described below with reference to FIGS. 1 and 2.

<Configuration of LED Driver Circuit 1>

Figure 1:
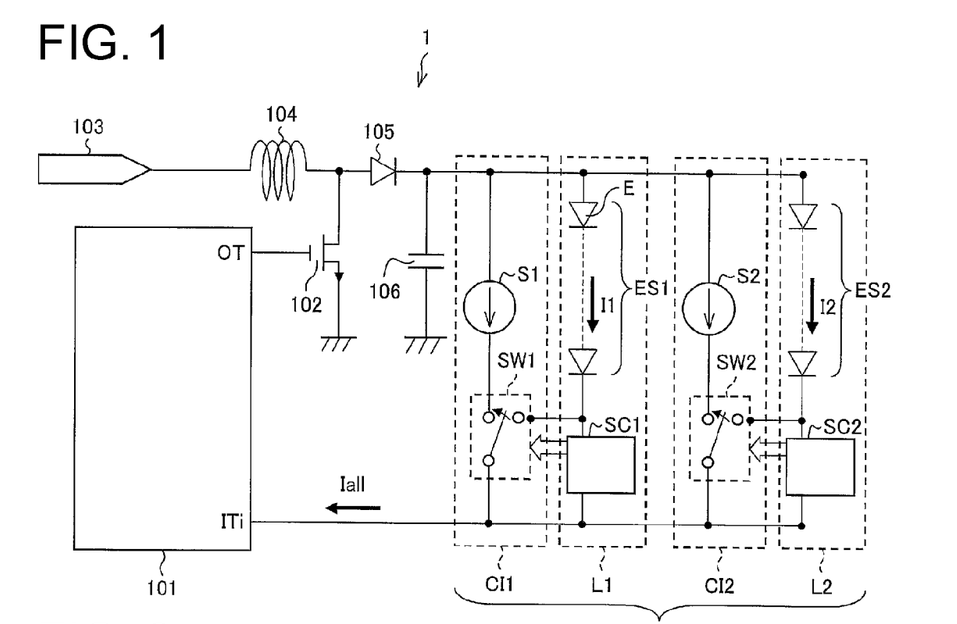
FIG. 1 shows a configuration of an LED driver circuit according to one embodiment of the present invention.

FIG. 1 shows a configuration of a light-emitting diode (LED) driver circuit 1 according to one embodiment of the present invention. As shown in FIG. 1, the LED driver circuit 1 includes a light-emitting module 10, a general use LED driving integrated circuit (IC) 101 (current control element), a semiconductor switch 102, a voltage source 103, an inductor 104, a diode 105, and a capacitor 106.

Main components included in the LED driver circuit 1 will be described in detail below.

(General Use LED Driving IC 101)

The general use LED driving IC 101 is a current control element that controls the sum of the currents flowing in the LED driver circuit 1 (value of current Iall) so as to be at a fixed value.

Also, the general use LED driving IC 101 includes a current input terminal ITi and a control output terminal OT, and is connected to other components through these terminals.

In the general use LED driving IC 101, even if the value of the current Iall fluctuates, the value of the current Iall can be kept at a constant rate by the general use LED driving IC 101 opening and closing the semiconductor switch 102. In other words, the LED driver circuit 1 controls a few light-element lines (light-element line L1, light-element line L2) at a time on the cathode side of the diode 105 such that the sum of the currents flowing through the light-element lines is constant.

The number of light-element lines, the arrangement, the number of light-emitting elements E included in each light-element line, and the like may be changed according to the specifications of the general use LED driving IC 101 (the allowable current value, the maximum number of lines, etc., for example).

(Light-Element Line L1 and Light-Element Line L2)

The light-element line L1 and the light-element line L2 are connected to each other in parallel, and the light-emitting module 10 is a module including the plurality of light-element lines. However, the configuration is not limited thereto, and three or more rows of light-element lines may constitute the light-emitting module 10. In other words, the LED driver circuit 1 has a plurality of light-element lines (light-element line L1, light-element line L2) connected to each other in parallel.

Each light-element line includes a light-emitting portion (light-emitting portion ES1, light-emitting portion ES2) having a plurality of light-emitting elements E, and an open-circuit detection circuit (detection unit) (open-circuit detection circuit SC1, open-circuit detection circuit SC2) that is connected in series to the light-emitting portion and detects an open state (a circuit state; an open/closed state) of the light-element line.

The light-emitting element E may be an LED or the like, but the configuration is not limited thereto, and any light-emitting element may be used as long as it emits light by a current flowing therethrough.

The circuit state refers to an electrical state in an electrical circuit such as a light-element line (light-element line L1, light-element line L2).

If the circuit state is "open," then this means that a portion of the electrical circuit is not electrically connected, which means that current cannot flow through the electrical circuit. If, for example, the light-element lines (light-element line L1, light-element line L2) are not operating normally due to damage in the light-emitting portions (light-emitting portion ES1, light-emitting portion ES2), the circuit states of the light-element lines could become open.

If the circuit state is "not open," this means that current can flow therethrough. If, for example, in the light-element lines (light-element line L1, light-element line L2), the light-emitting portions (light-emitting portion ES1, light-emitting portion ES2) are operating normally, the circuit could become non-open.

(Current Compensation Line CI1 and Current Compensation Line CI2)

A current compensation line CI1 and a current compensation line CI2 are connected in parallel to the respective light-element lines.

Each current compensation line includes: a fixed current source (fixed current source S1, fixed current source S2) that generates a current having approximately the same value as the current flowing through the light-element line when the light-element line (light-element line L1, light-element line L2) corresponding to each current compensation line is non-open; and a switch (switch SW1, switch SW2) that is connected in series to the fixed current source and switches the circuit state of the current compensation line. If the open-circuit detection circuit (open-circuit detection circuit SC1, open-circuit detection circuit SC2) included in the light-element line (light-element line L1, light-element line L2) corresponding to the current compensation line (current compensation line CI1, current compensation line CI2) including the switch detects that the circuit state is open, it switches the current compensation line to be non-open, and if the switch detects that the circuit state is closed, then it switches the current compensation line to be open.

The circuit state may additionally refer to an electrical state in an electrical circuit such as the current compensation line (fixed current source S1, fixed current source S2).

Also, if a portion of the electrical circuit is open due to the switch (switch SW1, switch SW2), for example, the current compensation line (current compensation line CI1, current compensation line CI2) can become open.

Also, if a portion of the electrical circuit is closed due to the switch (switch SW1, switch SW2), for example, the current compensation line (current compensation line CI1, current compensation line CI2) can become non-open.

(Open-Circuit Detection Circuit SC1 and Open-Circuit Detection Circuit SC2)

Figure 2:
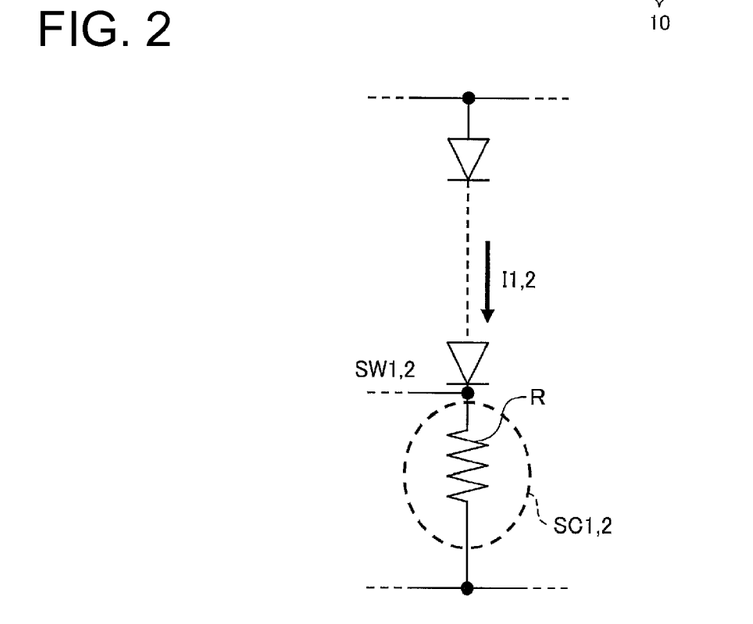
FIG. 2 shows a configuration of an open-circuit detection circuit included in the LED driver circuit shown in FIG. 1.

FIG. 2 shows a configuration of the open-circuit detection circuit SC1 and the open-circuit detection circuit SC2 included in the LED driver circuit shown in FIG. 1. As shown in FIG. 2, the open-circuit detection circuit includes a resistor R connected in series to the light-element line (light-element line L1, light-element line L2); if there is no voltage drop at the resistor, then the open-circuit detection circuit detects that the light-element line (light-element line L1, light-element line L2) including this open-circuit detection circuit is open, and if there is a voltage drop, then the open-circuit detection circuit detects that the light-element line is non-open.

In FIG. 1, the open-circuit detection circuit SC1 and the open-circuit detection circuit SC2 are connected to the cathode side of the light-emitting portion ES1 and the light-emitting portion ES2, respectively, but the configuration is not limited thereto, and the open-circuit detection circuits may be connected to the anode side.

Also, in FIG. 1, the switch SW1 and the switch SW2 are connected to the cathode side of the fixed current source S1 and the fixed current source S2, respectively, but the configuration is not limited thereto, and the switches may be connected to the anode side.

According to the configuration above, it is possible to detect the circuit state of the light-element lines (light-element lines L1 and light-element lines L2) by the open-circuit detection circuits (open-circuit detection circuit SC1, open-circuit detection circuit SC2) having a simple configuration constituted of the resistor R.

In other words, it is possible to provide a low cost LED driver circuit.

(Switch SW1 and Switch SW2)

The switch SW1 and the switch SW2 are connected in series to the fixed current sources (fixed current source S1 and fixed current source S2), include the current compensation lines (current compensation line CI1, current compensation line CI2), and switch the circuit state of the fixed current source.

TABLE 1

| Determination by Open-Circuit Detection Circuit | Switch |
| --- | --- |
| Non-Open (Normal Operation) | OFF |
| Open | ON |

Table 1 indicates the relation between the circuit state determined by the open-circuit detection circuit (open-circuit detection circuit SC1, open-circuit detection circuit SC2) and the state of the switch (switch SW1, switch SW2). As shown in Table 1, if the open-circuit detection circuit determines that the circuit is not open (operating normally), then the switch is turned OFF, and the current compensation line (current compensation line CI1, current compensation line CI2) including the switch is made to be open. If the open-circuit detection circuit determines that the circuit is open, then the switch is turned on, and the current compensation line including the switch is made to be non-open.

(Summary of Configuration of LED Driver Circuit 1)

As described above, the LED driver circuit 1 includes: a plurality of light-element lines (light-element line L1, light-element line L2) connected to each other in parallel; a general use LED driving IC 101 controlling the sum of currents flowing through the light-element lines (value of current Iall) so as to be a constant value; and current compensation lines (current compensation line CI1, current compensation line CI2) connected in parallel to each of the light-element lines, each light-element line including a light-emitting portion (light-emitting portion ES1, light-emitting portion ES2), and an open-circuit detection circuit (open-circuit detection circuit SC1, open-circuit detection circuit SC2) that is connected in series to the light-emitting portion and detects a circuit state of the light-element line, each of the current compensation lines including a fixed current source (fixed current source S1, fixed current source S2) that generates current at approximately the same value as the current flowing through each of the light-element lines if the light-element line corresponding to each of the current compensation lines is non-open, and a switch (switch SW1, switch SW2) that is connected in series to the fixed current source and switches a circuit state of the current compensation line, the switch switching the current compensation line (current compensation line CI1, current compensation line CI2) to be non-open if the circuit state detected by the open-circuit detection circuit (open-circuit detection circuit SC1, open-circuit detection circuit SC2) included in the light-element line (light-element line L1, light-element line L2) corresponding to the current compensation line (current compensation line CI1, current compensation line CI2) including the switch is open, the switch switching the current compensation line to be open if the circuit state is non-open.

<Operation of LED Driver Circuit 1>

According to the configuration above, if the light-element line (light-element line L1, light-element line L2) is open, no current flows in the light-element line. The open-circuit detection circuit (open-circuit detection circuit SC1, open-circuit detection circuit SC2) included in the light-element line detects that the light-element line is open, and the current compensation line (current compensation line CI1, current compensation line CI2) corresponding to the light-element line is switched to a non-circuit state by the switch (switch SW1, switch SW2) included in the current compensation line. In this manner, current (current I1, current I2) is supplied from the fixed current source (fixed current source S1, fixed current source S2) included in the current compensation line, and current flows in the current compensation line.

Here, the current flowing in the current compensation line has approximately the same value as the current flowing in the light-element line (light-element line L1, light-element line L2) corresponding to the current compensation line when the light-element line is non-open.

As a result, even if the light-element line (light-element line L1, light-element line L2) is open, the current having approximately the same value as when the light-element line is non-open is supplied from the current compensation line (current compensation line CI1, current compensation line CI2) to the LED driver circuit 1.

If the LED driver circuit 1 were not provided with the current compensation lines (current compensation line CI1, current compensation line CI2), then if any of the plurality of light-element lines (light-element line L1, light-element line L2) were to become open, the sum (value of current Iall) of the currents flowing in the LED driver circuit 1 would decrease, but current control is performed by the general use LED driving IC 101, causing the sum to return to its original value. Here, because the open light-element line does not allow current through, an excessive amount of current concentrates in the remaining non-open light-element lines, which can damage the light-element line.

However, the LED driver circuit 1 includes the current compensation lines (current compensation line CI1, current compensation line CI2), and thus, it is possible to protect the light-element lines (light-element line L1, light-element line L2) from such damage.

Also, if the light-element line (light-element line L1, light-element line L2) is non-open (operating normally), then the corresponding current compensation line is open, and therefore, no power is consumed except for when light is emitted from the light-emitting portion (light-emitting portion ES1, light-emitting portion ES2).

In other words, it is possible to provide an LED driver circuit 1, in which the size of the current flowing therein is controlled, able to protect the light-element lines and having low power consumption.

TABLE 2

| | Current I1 | Current from Fixed Current Source S1 | Current I2 | Current from Fixed Current Source S2 | Total Current |
|---|---|---|---|---|---|
| Normal Operation | 20 mA | 0 mA | 20 mA | 0 mA | 40 mA |
| Light-element line L1 Open | 0 mA | 20 mA | 20 mA | 0 mA | 40 mA |
| Light-element line L2 Open | 20 mA | 0 mA | 0 mA | 20 mA | 40 mA |

Table 2 indicates the values of the current I1 and the current I2 flowing respectively in the light-element line L1 and the light-element line L2, and the value of the currents respectively supplied by the fixed current source S1 and the fixed current source S2 included respectively in the current compensation line CI1 and the current compensation line CI2. As shown in Table 2, during normal operation, the current I1 and the current I2 flowing through the respective light-element lines is at 20 mA and the current supplied respectively by the fixed current source S1 and the fixed current source S2 is 0 mA. The total current is 40 mA.

Next, when the light-element line L1 is open, no current flows through the light-element line L1, and thus, the current I1 is at 0 mA. However, a current of 20 mA is supplied from the fixed current source S1 included in the current compensation line CI1 corresponding to the light-element line L1. As a result, the sum of the current I1 flowing through the light-element line L1 and the current supplied by the fixed current source S1 included in the current compensation line CI1 corresponding to the light-element line L1 is 20 mA, a value similar to that of normal operation. Also, the value of the current I2 flowing through the light-element line L2 and the current supplied by the fixed current source S2 included in the current compensation line CI2 does not change. Thus, the total current is 40 mA, a value similar to that of normal operation.

Similarly, when the light-element line L2 is open, no current flows through the light-element line L2, and thus, the current I2 is at 0 mA. However, a current of 20 mA is supplied from the fixed current source S2 included in the current compensation line CI2 corresponding to the light-element line L2. As a result, the sum of the current I2 flowing through the light-element line L2 and the current supplied by the fixed current source S2 included in the current compensation line CI2 corresponding to the light-element line L2 is 20 mA, a value similar to that of normal operation. Also, the value of the current I1 flowing through the light-element line L1 and the current supplied by the fixed current source S1 included in the current compensation line CI1 does not change. Thus, the total current is 40 mA, a value similar to that of normal operation.

In other words, even if the light-element line L1 and/or the light-element line L2 is open, the value of the current Iall flowing in the LED driver circuit 1 can be kept at a fixed value.

The conventional technique disclosed in Patent Document 1 will be compared to the present embodiment below in order to explain how the LED driver circuit 1 of the present embodiment consumes less power than the LED driver circuit 1000 of the conventional technique disclosed in Patent Document 1.

<Comparison Between Conventional Technique Disclosed in Patent Document 1 and the Present Embodiment>

TABLE 3

|  | Patent Document 1 | Present Embodiment (During Normal Operation) | (When Circuit Open) |
|---|---|---|---|
| Normally Necessary Current | 40 mA | 40 mA | 40 mA |
| Current I1 | 20 mA | 20 mA | 0 mA (open) |
| Current Needed to Achieve Fixed Current | 1 mA | 0 mA | 20 mA |
| Current I2 | 20 mA | 20 mA | 20 mA |
| Current Needed to Achieve Fixed Current | 1 mA | 0 mA | 0 mA |
| Total Current | 42 mA | 40 mA | 40 mA |
| Extra Current | 2 mA | 0 mA | 0 mA |

Table 3 shows a comparison between the conventional technique disclosed in Patent Document 1 and the present embodiment. Below, in the conventional technique disclosed in Patent Document 1 and shown in FIG. 7, the LED driver circuit 1000 includes only two rows of light-element lines 1013, one of the light-element lines having a current I1 flowing therethrough, the other of which has a current I2 flowing therethrough, and this configuration is compared to the LED driver circuit 1 of the present embodiment.

As shown in Table 3, in the conventional technique disclosed in Patent Document 1 and the present embodiment, a current of 20 mA needs to flow through each row of light-element lines, and as a whole, there is a need for a total of 40 mA of current to flow in the LED driver circuit.

In Patent Document 1, whether any of the plurality of light-element lines (light-element lines 1013) is open or not open, 1 mA of current is required per row of light-element line in order to keep the current fixed, and a total of 42 mA flows in the LED driver circuit 1000. In other words, the amount of current normally necessary is 40 mA, and an extra 2 mA of wasted current always flows.

On the other hand, in the present embodiment, when all of the plurality of light-element lines are non-open (i.e., operating normally), the current compensation line CI1 and the current compensation line CI2 are open, and thus, unlike the configuration of the conventional technique disclosed in Patent Document 1, no extra current flows.

Also, in the present embodiment, if any of the plurality of light-element lines (light-element line L1, light-element line L2) such as the light-element line L1 is open, the current compensation line CI1 is made to be non-open, and a current having approximately the same value as that flowing through the light-element line L1 during normal operation is supplied from the fixed current source S1 to the current compensation line CI1. In other words, even in such a case, no extra current flows through.

That is, the LED driver circuit 1 of the present embodiment has lower power consumption compared to the LED driver circuit 1000 of the conventional technique disclosed in Patent Document 1 because no extra current flows therein.

<Effects of LED Driver Circuit 1>

According to the present embodiment, it is possible to provide an LED driver circuit, in which the size of the current flowing therein is controlled, able to protect the light-element lines and having low power consumption.

Also, it is possible to provide a low cost LED driver circuit.

Furthermore, it is possible to attain a low cost LED driver circuit that can protect the light-element lines by using a general use LED driving IC. In this manner, it is possible to reduce the cost of the LED driver circuit.

An embodiment in which the sum of the currents flowing in the LED driver circuit is controlled to be at a fixed value was described above. An embodiment in which the sum of the currents flowing in the LED driver circuit is controlled to be at a variable target value will be described below.

Embodiment 2

Another embodiment according to the present invention is as described below with reference to FIGS. 3 and 4. For ease of explanation, the members having the same functions as in drawings described in the previous embodiments are given the same reference characters, and the descriptions thereof are omitted.

<Configuration of LED Driver Circuit 2>

Figure 3:
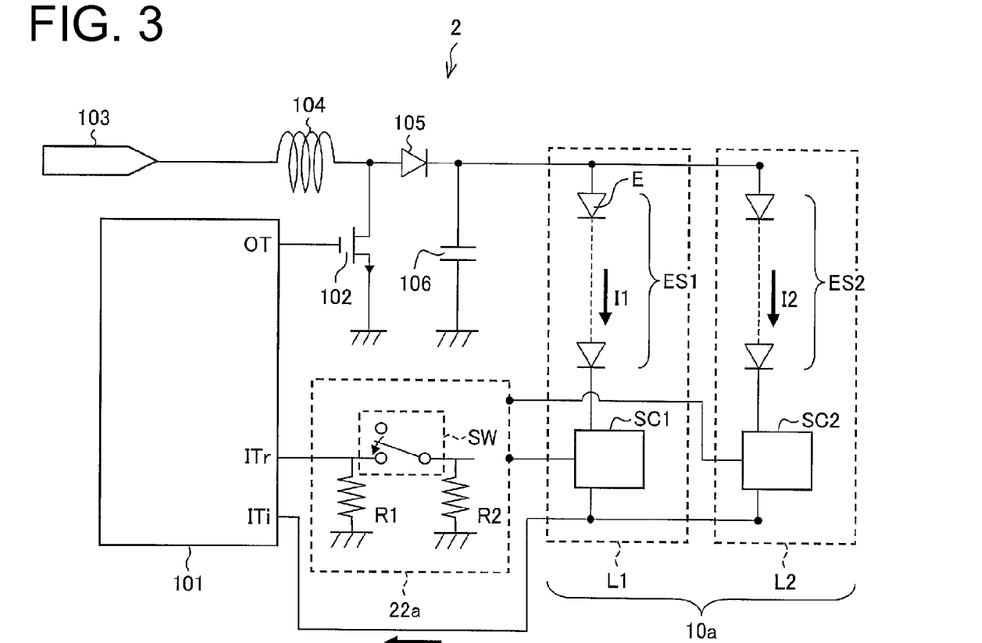
FIG. 3 is a diagram showing a configuration of an LED driver circuit according to another embodiment of the present invention.

FIG. 3 is a diagram showing a configuration of an LED driver circuit 2 (circuit) according to another embodiment of the present invention. As shown in FIG. 3, the LED driver circuit 2, like the LED driver circuit 1, includes a general use LED driving IC 101, a semiconductor switch 102, a voltage source 103, an inductor 104, a diode 105, and a capacitor 106.

However, unlike the LED driver circuit 1, the LED driver circuit 2 includes a light-emitting module 10a instead of the light-emitting module 10 and includes a set value providing part 22a (set value providing unit), and the general use LED driving IC 101 includes a resistor input terminal ITr.

Also, in the LED driver circuit 2, the general use LED driving IC 101 controls the sum of the currents flowing in the LED driver circuit 2 to be at a variable target value.

Main components included in the LED driver circuit 2 will be described in detail below.

(Light-Emitting Module 10a)

Unlike the light-emitting module 10, the light-emitting module 10a does not include current compensation lines corresponding respectively to the light-element line L1 and the light-element line L2. Also, the open-circuit detection circuit SC1 and the open-circuit detection circuit SC2 are connected to the set value providing part 22a.

(Set Value Providing Part 22a)

The set value providing part 22a provides a set value to the general use LED driving IC 101.

Also, the set value providing part 22a changes the set value on the basis of the circuit state of the light-element line L1 and the light-element line L2 detected by the open-circuit detection circuit SC1 and the open-circuit detection circuit SC2.

Here, "changes the set value on the basis of the circuit state" means that the set value providing part 22a generates the set value corresponding to each combination of circuit states.

Specifically, this means that a "circuit configuration (resistance)" is generated as the set value corresponding to each "determination by the detection circuit" in Table 5 below.

In other words, this means generating a resistance (50 kΩ) corresponding to a combination in which both the light-element line L1 and the light-element line L2 are non-open (operating normally).

Alternatively, this means generating a resistance (100 kΩ) corresponding to a combination in which one of the light-element line L1 and the light-element line L2 is open.

The configuration is not limited thereto, and if the number of open-circuit detection circuits increases and the number of combinations increases, the resistance corresponding to these combinations as the set value may be increased.

The general use LED driving IC 101 changes the target value on the basis of the changed set value. The changed target value is changed so as to be a value obtained by subtracting, from the value prior to being changed, the sum of currents flowing in the light-element lines if the light-element lines detected to be open are non-open.

Here, "changes the target value on the basis of the set value" means that the target value corresponding to each set value is generated.

Specifically, this means that a "total current" is generated as a target value corresponding to each "circuit configuration (resistance)" in Table 5 below.

In other words, a total current (40 mA) corresponding to the resistance (50 kΩ) is generated.

Alternatively, a total current (20 mA) corresponding to the resistance (100 kΩ) is generated.

The configuration is not limited thereto, and if the number of open-circuit detection circuits increases and the number of combinations increases, the total current as the target value corresponding thereto may be increased.

The set value providing part 22a includes a plurality of resistors (resistor R1, resistor R2), and a switch SW that switches and combines the plurality of resistors.

The switch SW is switched on the basis of the circuit state detected by the open-circuit detection circuit SC1 and the open-circuit detection circuit SC2. The set value is obtained as the resistance of the set value providing part 22a.

Here, "switched on the basis of the circuit state" means that switching is performed for each combination of circuit states.

Specifically, this means that the switch SW is switched to the "switch" state corresponding to each "determination by the detection circuit" in Table 5 below.

In other words, this means the switch SW is closed so as to be ON for a combination of circuit states in which both the light-element line L1 and the light-element line L2 are non-open (operating normally).

Alternatively, this means the switch SW is opened so as to be OFF for a combination of circuit states in which either of the light-element line L1 and the light-element line L2 is open.

The configuration is not limited thereto, and if the number of open-circuit detection circuits increases and the number of combinations increases, the number of switches may be increased in correspondence to this. If the number of switches increases to a plurality of switches, the switch state may mean the combination of switch states.

According to the configuration above, by the set value providing part 22a having a simple configuration in which a plurality of resistors (resistor R1, resistor R2) are combined by the switch SW, it is possible to provide a desired resistance on the basis of the circuit state detected by the open-circuit detection circuit SC1 and the open-circuit detection circuit SC2 to the general use LED driving IC 101 as a set value through the resistor input terminal ITr, as described above. In this manner, it is possible to reduce the cost of the set value providing part 22a.

In other words, it is possible to provide a low cost LED driver circuit.

TABLE 4

| Resistance | Total Current |
|---|---|
| 100 kΩ | 20 mA |
| 50 kΩ | 40 mA |

Table 4 shows the relation between the resistance provided from the set value providing part 22a to the general use LED driving IC 101, and the value of the current Iall (total current) flowing in the LED driver circuit 2 when controlling the general use LED driving IC 101 based on the resistance. Below, it is assumed that the individual resistance values of the resistor R1 and the resistor R2 are 100 kΩ.

As shown in FIG. 4, if the resistance provided by the set value providing part 22a to the general use LED driving IC 101 is 100 kΩ, then the general use LED driving IC 101 controls the value of the current Iall flowing in the LED driver circuit 2 such that the total current is 20 mA. If the resistance is 50 kΩ, then the general use LED driving IC 101 controls the value of the current Iall flowing in the LED driver circuit 2 such that the total current is 40 mA.

TABLE 5

| Determination by Detection Circuit | Switch | Circuit Configuration (Resistance) | Total Current |
|---|---|---|---|
| Normal Operation | ON | R1 and R2 in Parallel (50 kΩ) | 40 mA |
| One of Lines Open | OFF | Only R1 (100 kΩ) | 20 mA |

Table 5 shows an example of a specific circuit configuration of the switch SW, the resistor R1, and the resistor R2 when the set value providing part 22a provides the resistance shown in table 4.

As shown in Table 5, if the light-element lines (light-element line L1, light-element line L2) are non-open, and the open-circuit detection circuits (open-circuit detection circuit SC1, open-circuit detection circuit SC2) determine that the normal operation is taking place, then the switch SW is turned ON. In this manner, a circuit configuration is adopted in which the resistor R1 and the resistor R2 are connected in parallel, and a resistance of 50 kΩ is inputted (provided) to the resistor input terminal ITr of the general use LED driving IC 101. If any of the light-element lines are open, then the switch SW is turned OFF. As a result, only the resistor R1 is connected to the resistor input terminal of the general use LED driving IC 101, and 100 kΩ is inputted.

The resistance value is not limited to this configuration, and the resistance values of the respective resistors, the number of resistors, the number of switches, and the circuit configuration may be modified based on the specifications of the general use LED driving IC 101 and the number of open-circuit detection circuits (open-circuit detection circuit SC1, open-circuit detection circuit SC2).

The set value providing part 22a may have a configuration relying on software instead of a configuration relying on hardware such as the resistor R1, the resistor R2, and the switch SW. Below, a set value providing part 22b (set value providing unit), which is a modification example of the set value providing part 22a using software, will be described in detail.

(Set Value Providing Part 22b)

Figure 4:
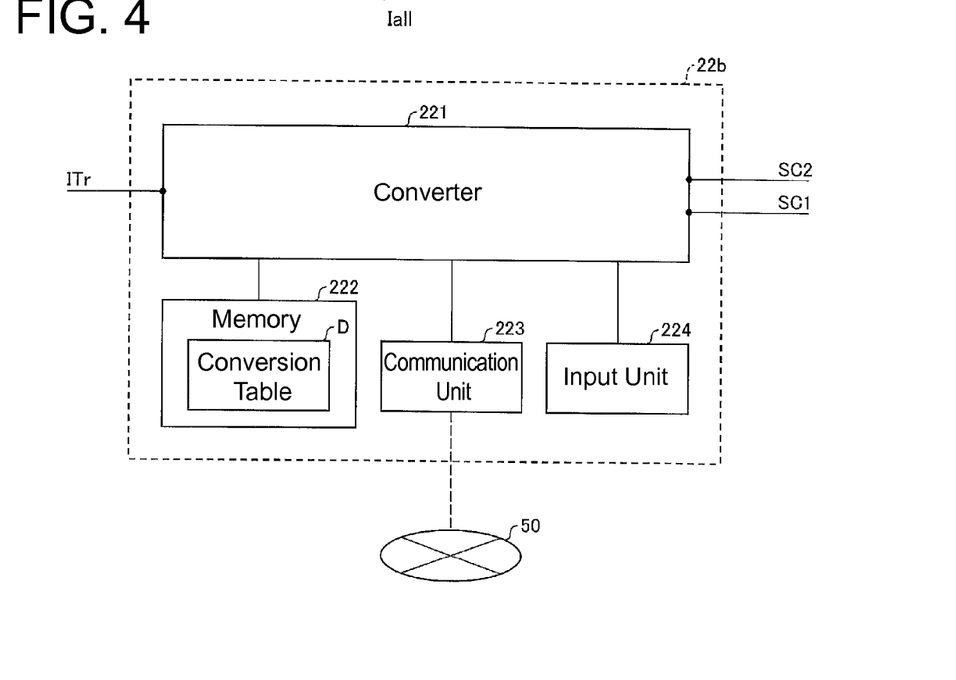
FIG. 4 shows a configuration of a modification example of a set value providing part included in the LED driver circuit shown in FIG. 3.

FIG. 4 shows a configuration of the set value providing part 22b, which is a modification example of the set value providing part 22a included in the LED driver circuit 2 shown in FIG. 3. As shown in FIG. 4, the set value providing part 22b includes a converter 221 (conversion unit), a memory 222, a communication unit 223, and an input unit 224.

The memory 222 stores a conversion table D for converting the circuit state detected by the open-circuit detection circuit SC1 and the open-circuit detection circuit SC2 to the set value to be provided to the general use LED driving IC 101 through the resistor input terminal ITr.

The converter 221 converts the circuit state detected by the open-circuit detection circuit SC1 and the open-circuit detection circuit SC2 to the set value on the basis of the conversion table D.

The conversion table D has stored therein a correspondence between the circuit state detected by the open-circuit detection circuits (open-circuit detection circuit SC1, open-circuit detection circuit SC2) and the set values.

Specifically, the conversion table D stores the contents of the "Determination by Detection Circuit" and the "Circuit Configuration (Resistance)" in table 5.

For example, a correspondence between the circuit state "Normal Operation (All Circuit States Non-Open)" as detected by the open-circuit detection circuit and the resistance value "50 kΩ" as the set value is stored, and the converter 221 reads in the contents to convert the circuit state to the set value.

Also, a correspondence between the circuit state "One of Lines (Light-element line L1, Light-element line L2) Open" as detected by the open-circuit detection circuit and the resistance value "100 kΩ" as the set value is stored, and the converter 221 reads in the contents to convert the circuit state to the set value.

In other words, the converter 221 refers to the conversion table D and converts the circuit state detected by the open-circuit detection circuits (open-circuit detection circuit SC1, open-circuit detection circuit SC2) to the set value.

The conversion relying on the conversion table D as described above is completed by converting the circuit state to the set value without any calculation.

According to the configuration above, the converter 221 converts the set value using the conversion table D on the basis of the circuit state of the light-element line L1 and the light-element line L2 detected by the open-circuit detection circuit SC1 and the open-circuit detection circuit SC2. In this manner, the set value providing part 22b can provide to the general use LED driving IC 101 the set value on the basis of the circuit state of the light-element line L1 and the light-element line L2 detected by the open-circuit detection circuit SC1 and the open-circuit detection circuit SC2.

Also, the converter 221 performs conversion using the conversion table D without performing calculation, and thus, the set value providing part 22b can provide the set value at high speed.

In other words, it is possible to provide an LED driver circuit by which it is possible to protect the light-element lines (light-element line L1, light-element line L2) at high speed.

Here, if the set value providing part 22b were to be configured by hardware (resistors, switches, etc., for example) and the specifications of the general use LED driving IC 101 were modified, then there is a possibility that the parts included among the hardware need to be changed based on the modification of the specifications.

However, the above-mentioned set value providing part 22b can be made to match the modification in specifications by a simpler operation such as updating the conversion table D by communication from the communication unit 223 or by direct input from the input unit 224, for example.

In other words, it is possible to provide an easy to operate LED driver circuit.

The set value may be a value representing resistance.

In a general use current control element such as a general use LED driving IC 101, a current control terminal controlling the current by the resistance value is provided, and there are cases in which it is necessary to input (provide) the set value based on the resistance value.

According to the configuration above, the set value providing part 22b can appropriately provide the set value even if it is necessary for the general use LED driving IC 101 to provide the set value based on the resistance value.

In other words, it is possible to provide an LED driver circuit able to use a general use current control element.

(Summary of Configuration of LED Driver Circuit 2)

As described above, the LED driver circuit 2 has a plurality of light-element lines (light-element line L1, light-element line L2) connected to each other in parallel, and includes: a general use LED driving IC 101 that controls the sum of the currents flowing in the LED driver circuit 2 (value of current Iall) to be a variable target value; and a set value providing part (set value providing part 22a, set value providing part 22b) providing a set value to the general use LED driving IC 101, each light-element line including a light-emitting portion (light-emitting portion ES1, light-emitting portion ES2), and an open-circuit detection circuit (open-circuit detection circuit SC1, open-circuit detection circuit SC2) that is connected in series to the light-emitting portion and detects a circuit state of the light-element line, the set value providing part generating the set value for each combination of circuit states of the plurality of light-element lines detected by the detection unit, the general use LED driving IC 101 generating the target value for each generated set value, the generated target value being a value obtained by subtracting, from the value prior to being generated, the sum of currents flowing in the light-element lines if the light-element lines detected to be open are non-open.

As shown in FIG. 2, in the LED driver circuit 2 also, the open-circuit detection circuit includes a resistor R connected in series to the light-element line (light-element line L1, light-element line L2); if there is no voltage drop at the resistor, then the open-circuit detection circuit may detect that the light-element line (light-element line L1, light-element line L2) including this open-circuit detection circuit is open, and if there is a voltage drop, then the open-circuit detection circuit may detect that the light-element line is non-open.

In FIG. 3, the open-circuit detection circuit SC1 and the open-circuit detection circuit SC2 are connected to the cathode side of the light-emitting portion ES1 and the light-emitting portion ES2, respectively, but the configuration is not limited thereto, and the open-circuit detection circuits may be connected to the anode side.

According to the configuration above, it is possible to detect the circuit state of the light-element lines (light-element lines L1 and light-element lines L2) by the open-circuit detection circuits (open-circuit detection circuit SC1, open-circuit detection circuit SC2) having a simple configuration constituted of the resistor R.

Also, in the LED driver circuit 2, the set value providing part 22b having the configuration shown in FIG. 4 and the open-circuit detection circuits (open-circuit detection circuit SC1, open-circuit detection circuit SC2) having the configuration shown in FIG. 2 may simultaneously be included.

<Operation of LED Driver Circuit 2>

According to the configuration above, if the light-element line (light-element line L1, light-element line L2) is open, no current flows in the light-element line. The open-circuit detection circuits (open-circuit detection circuit SC1, open-circuit detection circuit SC2) included in the light-element lines detect whether or not the light-element lines are open. The set value providing parts (set value providing part 22a, set value providing part 22b) generate a set value for each combination of detected circuit states of the light-element lines. The general use LED driving IC 101 generates the target value on the basis of the generated set value.

The generated target value is a value obtained by subtracting, from the value prior to being generated, the sum of currents flowing in the light-element lines if the light-element lines detected to be open are non-open.

Thus, the target value decreases in response to the decrease in sum (value of current Iall) of the currents flowing in the LED driver circuit 2.

If any of the plurality of light-element lines (light-element line L1, the light-element line L2) is open, the sum of currents (value of current Iall) flowing in the LED driver circuit 2 decreases. If the sum becomes less than the target value, then the general use LED driving IC 101 controls the current such that the sum returns to its original value. Here, because the open light-element line does not allow current through, an excessive amount of current concentrates in the remaining non-open light-element lines, which can damage the light-element line.

However, the target value decreases in response to the decrease in the sum, and thus, the light-element lines (light-element line L1, light-element line L2) can be protected from damage.

When the target value is changed, no power is consumed other than for illuminating the light-emitting portions (light-emitting portion ES1, light-emitting portion ES2).

In other words, it is possible to provide an LED driver circuit, in which the size of the current flowing therein is controlled, able to protect the light-element lines and having low power consumption.

TABLE 6

|  | Current I1 | Current I2 | Total Current |
|---|---|---|---|
| Normal Operation | 20 mA | 20 mA | 40 mA |
| Light-element line L1 Open | 0 mA | 20 mA | 20 mA |
| Light-element line L2 Open | 20 mA | 0 mA | 20 mA |

Table 6 shows the value of the current I1 flowing through the light-element line L1 of the LED driver circuit 2, the value of the current I2 flowing through the light-element line L2, and the sum of the current I1 and the current I2 (total current). As shown in table 6, during normal operation when the light-element line L1 and the light-element line L2 are non-open, the current I1 is at 20 mA and the current I2 is at 20 mA. Thus, the total current is 40 mA.

Next, when the light-element line L1 is open, no current flows through the light-element line L1, and thus, the current I1 becomes 0 mA. The light-element line L2 is non-open, and thus, the current I2 becomes 20 mA. Thus, the total current is 20 mA. The value of the current Iall flowing in the LED driver circuit 2 is the total of the current I1 and the current I2. In other words, the current Iall flowing in the LED driver circuit 2 is controlled to be a fixed value of 20 mA.

Next, when the light-element line L2 is open, no current flows through the light-element line L2, and thus, the current I2 becomes 0 mA. The light-element line L1 is non-open, and thus, the current I1 becomes 20 mA. In other words, the current Iall flowing in the LED driver circuit 2 is controlled to be a fixed value of 20 mA.

As described above, in the LED driver circuit 2, the current flowing through the non-open light-element line is controlled to be at a fixed value (20 mA).

<Effects of LED Driver Circuit 2>

According to the present embodiment, it is possible to provide an LED driver circuit, in which the size of the current flowing therein is controlled, able to protect the light-element lines and having low power consumption.

Also, according to the present embodiment, it is possible to provide a low cost LED driver circuit.

Also, according to the present embodiment, it is possible to provide an LED driver circuit able to quickly protect the light-element lines.

Also, according to the present embodiment, it is possible to provide an easy to operate LED driver circuit.

Also, according to the present embodiment, it is possible to provide an LED driver circuit able to use a general use LED driving IC.

Below, an embodiment of an LED driver circuit including a voltage control element that controls the potential difference in the LED driver circuit will be described.

Embodiment 3

Another embodiment according to the present invention is as described below with reference to FIG. 5. For ease of explanation, the members having the same functions as in drawings described in the previous embodiments are given the same reference characters, and the descriptions thereof are omitted.

<Configuration of LED Driver Circuit 3>

Figure 5:
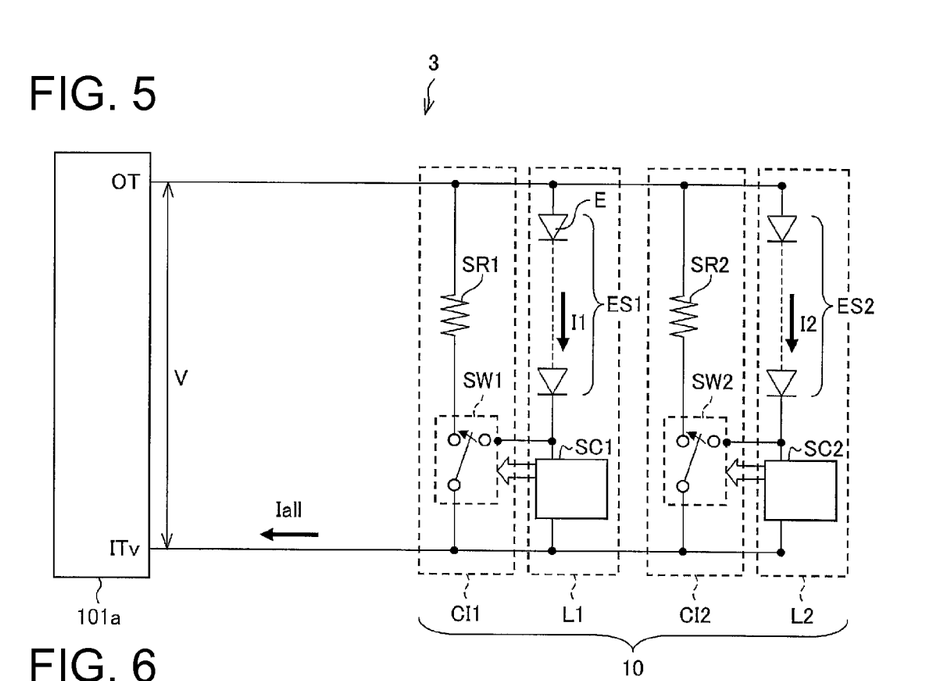
FIG. 5 is a drawing showing a configuration of an LED driver circuit according to another embodiment of the present invention.

FIG. 5 is a drawing showing a configuration of an LED driver circuit 3 (circuit) according to another embodiment of the present invention. As shown in FIG. 5, the LED driver circuit 3, like the LED driver circuit 1, includes a light-emitting module 10.

However, unlike the LED driver circuit 1, the LED driver circuit 3 includes not a general use LED driving IC 101 but a general use LED driving IC 101a (voltage control element), and the general use LED driving IC 101a includes a light-adjustment terminal ITv (adjusting light by voltage).

The general use LED driving IC 101a is a voltage control element that controls a potential difference V of the LED driver circuit 3.

Also, the general use LED driving IC 101a includes a light-adjustment terminal ITv and a control output terminal OT, and is connected to other components through these terminals.

The current compensation line CI1 and the current compensation line CI2 include resistors (resistor SR1, resistor SR2) having approximately the same resistance as the light-emitting portions (light-emitting portion ES1, light-emitting portion ES2) respectively included in corresponding light-element lines (light-element line L1, light-element line L2).

As described above, the LED driver circuit 3 includes: a plurality of light-element lines (light-element line L1, light-element line L2) connected to each other in parallel; a general use LED driving IC 101 controlling the sum of currents flowing through the light-element lines (value of current Iall) so as to be a constant value; and current compensation lines (current compensation line CI1, current compensation line CI2) connected in parallel to each of the light-element lines, each light-element line including a light-emitting portion (light-emitting portion ES1, light-emitting portion ES2), and an open-circuit detection circuit (open-circuit detection circuit SC1, open-circuit detection circuit SC2) that is connected in series to the light-emitting portion and detects a circuit state of the light-element line, each of the current compensation lines including a resistor (resistor SR1, resistor SR2) having approximately the same resistance as the light-emitting portion included in the light-element line corresponding to each of the current compensation lines, and a switch (switch SW1, switch SW2) that is connected in series to the resistor and switches the circuit state of each of the current compensation lines, the switch switching the current compensation line to be non-open if the circuit state detected by the open-circuit detection circuit included in the light-element line corresponding to the current compensation line including the switch is open, the switch switching the current compensation line to be open if the circuit state is non-open.

As shown in FIG. 2, in the LED driver circuit 3 also, the open-circuit detection circuit includes a resistor R connected in series to the light-element line (light-element line L1, light-element line L2); if there is no voltage drop at the resistor, then the open-circuit detection circuit may detect that the light-element line (light-element line L1, light-element line L2) including this open-circuit detection circuit is open, and if there is a voltage drop, then the open-circuit detection circuit may detect that the light-element line is non-open.

In FIG. 5, the open-circuit detection circuit SC1 and the open-circuit detection circuit SC2 are connected to the cathode side of the light-emitting portion ES1 and the light-emitting portion ES2, respectively, but the configuration is not limited thereto, and the open-circuit detection circuits may be connected to the anode side.

According to the configuration above, it is possible to detect the circuit states of the light-element lines (light-element lines L1 and light-element lines L2) by the open-circuit detection circuits (open-circuit detection circuit SC1, open-circuit detection circuit SC2) having a simple configuration constituted of the resistor R.

<Operation of LED Driver Circuit 3>

According to the configuration above, if the light-element line (light-element line L1, light-element line L2) is open, no current flows in the light-element line. The open-circuit detection circuit (open-circuit detection circuit SC1, open-circuit detection circuit SC2) included in the light-element line detects that the light-element line is open, and the current compensation line (current compensation line CI1, current compensation line CI2) corresponding to the light-element line is switched to a non-circuit state by the switch (switch SW1, switch SW2) included in the current compensation line. As a result, a potential difference occurs in the resistors (resistor SR1, resistor SR2) included in the current compensation lines, resulting in current flowing in the current compensation lines.

The resistors have approximately the same resistance as the light-emitting portions (light-emitting portion ES1, light-emitting portion ES2) included in the light-element lines (light-element line L1, light-element line L2) corresponding to the current compensation lines. In this manner, the current flowing in the current compensation line has approximately the same value as the current flowing in the light-element line (light-element line L1, light-element line L2) corresponding to the current compensation line when the light-element line is non-open.

As a result, even if the light-element line (light-element line L1, light-element line L2) is open, the current having approximately the same value as when the light-element line is non-open is supplied from the current compensation line (current compensation line CI1, current compensation line CI2) to the circuit.

If the LED driver circuit 3 were not provided with the current compensation lines (current compensation line CI1, current compensation line CI2), then if any of the plurality of light-element lines (light-element line L1, light-element line L2) were to become open, then the sum (value of current Iall) of the currents flowing in the LED driver circuit 3 decreases. Unlike the current control element, the general use LED driving IC 101a is a voltage control element, and thus, does not monitor the current flowing in the LED driver circuit 3, which can result in changes in current preventing normal operation. This can also result in damage to the light-element lines (light-element line L1, light-element line L2).

However, the LED driver circuit 3 includes the current compensation lines (current compensation line CI1, current compensation line CI2), and thus, even if the current is not controlled, it is possible to keep the sum of the currents flowing in the LED driver circuit 3 (value of the current Iall) at a substantially constant value, and thus, it is possible to protect the light-element lines (light-element line L1, light-element line L2) from damage.

Also, if the light-element line (light-element line L1, light-element line L2) is non-open (operating normally), then the corresponding current compensation line is open, and therefore, no power is consumed except for when light is emitted from the light-emitting portion (light-emitting portion ES1, light-emitting portion ES2).

<Effects of LED Driver Circuit 3>

According to the present embodiment, it is possible to provide an LED driver circuit, in which the potential difference is controlled, able to protect the light-element lines and having low power consumption.

Also, it is possible to provide a low cost LED driver circuit.

<Summary>

A circuit (LED driver circuit 1) according to one aspect of the present invention includes: a plurality of light-element lines connected to each other in parallel; a current control element (general use LED driving IC 101) controlling a sum of current flowing through the light-element lines so as to be a fixed value; and current compensation lines connected in parallel to each of the light-element lines, each light-element line including a light-emitting portion, and a detection unit (open-circuit detection circuit SC1, open-circuit detection circuit SC2) that is connected in series to the light-emitting portion and detects a circuit state of the light-element line, each of the current compensation lines including a fixed current source that generates current at approximately the same value as the current flowing through each of the light-element lines if the light-element line corresponding to each of the current compensation lines is non-open, and a switch that is connected in series to the fixed current source and switches a circuit state of the current compensation line, the switch switching the current compensation line to be non-open if the circuit state detected by the detection unit included in the light-element line corresponding to the current compensation line including the switch is open, the switch switching the current compensation line to be open if the circuit state is non-open.

Here, the circuit state refers to an electrical state in an electrical circuit such as a light-element line or a current compensation line.

If the circuit state is "open," then this means that a portion of the electrical circuit is not electrically connected, which means that current cannot flow through the electrical circuit.

The light-element line can become open if a malfunction such as damage to the light-emitting portion occurs, for example. If a portion of the electrical circuit is open due to a switch, then the current compensation line can become open, for example.

If the circuit state is "not open," this means that current can flow therethrough. The light-element line can become non-open if light-emitting portion is operating normally, for example. If a portion of the electrical circuit is closed due to a switch, then the current compensation line can become non-open, for example.

According to the configuration above, if the light-element line is open, no current flows in the light-element line. The detection unit included in the light-element line detects that the light-element line is open, and the switch included in the current compensation line corresponding to the light-element line switches the current compensation line so as to be non-open. As a result, current is supplied from fixed current sources included in the current compensation lines, resulting in current flowing in the current compensation lines.

Here, the current flowing in the current compensation line has approximately the same value as the current flowing in the light-element line corresponding to the current compensation line when the light-element line is non-open.

"Approximately the same value" means that the values need not necessarily be the same. Furthermore, this means that the value may fluctuate due to some reason.

The current generated by the fixed current source can fluctuate due to degradation of components in the circuit over time or the environment in which the circuit is placed, for example (here, environment may refer to temperature, humidity, or the like, for example). However, as long as the current does not exceed the absolute maximum rating for current of the light-emitting portion included in the light-element line or the current is within a range that does not result in damage to the light-element line, this fluctuation can be said to be within an allowable range, and the current values can be said to be approximately the same.

As a result, even if the light-element line is open, the current having approximately the same value as when the light-element line is non-open is supplied from the current compensation line to the circuit.

If the circuit does not include a current compensation line, then if any of the plurality of light-element lines are open, then the sum of the currents flowing through the circuit decreases, but current control is performed by the current control element, and the sum returns to its original value. Here, because the open light-element line does not allow current through, an excessive amount of current concentrates in the remaining non-open light-element lines, which can damage the light-element line.

However, the circuit includes the above-mentioned current compensation line, and thus, the light-element line can be protected from damage.

Also, if the light-element line is non-open (operating normally), then the corresponding current compensation line is open, and therefore, no power is consumed except for when light is emitted from the light-emitting portion.

In other words, it is possible to provide a circuit, in which the size of the current flowing therein is controlled, able to protect the light-element lines and having low power consumption.

A circuit (LED driver circuit 2) according to one aspect of the present invention includes: a plurality of light-element lines connected to each other in parallel; a current control element controlling a sum of current flowing through the circuit to match a variable target value; and a set value providing unit (set value providing part 22a, set value providing part 22b) providing a set value to the current control element, each of the light-element lines including a light-emitting portion and a detection unit connected in series to the light-emitting portion and detecting a circuit state of the light-element line, the set value providing unit generating the set value for each combination of circuit states of the plurality of light-element lines detected by the detection unit, the current control element generating the target value for each generated set value, the generated target value being a value obtained by subtracting, from the value prior to being generated, the sum of currents flowing in the light-element lines if the light-element lines detected to be open are non-open.

According to the configuration above, if the light-element line is open, no current flows in the light-element line. The detection unit included in the light-element line detects that the light-element line is open. The set value providing unit changes the set value on the basis of the circuit state of the light-element line detected by the detection unit. The current control element changes the target value on the basis of the changed set value.

The changed target value is a value obtained by subtracting, from the value prior to being changed, the sum of currents flowing in the light-element lines if the light-element lines detected to be open are non-open.

Thus, the target value decreases in response to the decrease in sum of the currents flowing in the circuit.

If any of the plurality of light-element lines is open, then the sum of the currents flowing in the circuit decreases. If the sum becomes less than the target value, then the current control element controls the current such that the sum returns to its original value. Here, because the open light-element line does not allow current through, an excessive amount of current concentrates in the remaining non-open light-element lines, which can damage the light-element line.

However, the target value decreases in response to the decrease in the sum, and thus, the light-element lines can be protected from damage.

Also, when the target value is changed, no power is consumed other than for illuminating the light-emitting portions.

In other words, it is possible to provide a circuit, in which the size of the current flowing therein is controlled, able to protect the light-element lines and having low power consumption.

Also, in a circuit according to one aspect of the present invention, a configuration may be adopted in which the set value providing unit includes a plurality of resistors and a switch that switches and combines the plurality of resistors, the switch is switched for each combination of circuit states of the plurality of light-element lines detected by the detection unit, and the set value is a resistance of the set-value providing unit.

According to the configuration above, it is possible to provide a desired resistance based on the circuit state detected by the detection unit as a set value to the current control element by using a set value providing unit having a simple configuration combining a plurality of resistors using a switch. In this manner, it is possible to reduce the cost of the set value providing unit.

In other words, it is possible to provide a low cost circuit.

Also, in a circuit according to one aspect of the present invention, the set value providing unit may include a memory storing a conversion table indicating a relation between the circuit states detected by the detection unit, and the set values, and a conversion unit (converter 221) that refers to the conversion table and converts the circuit states detected by the detection unit to the set values.

According to the configuration above, the conversion unit converts the circuit state of the light-element line detected by the detection unit to a set value using a conversion table. In this manner, the set value providing means can provide a set value based on the circuit state of the light-element line detected by the detection unit to the current control element.

Also, the conversion unit performs conversion using the conversion table without performing calculation, and thus, the set value providing unit can provide the set value at high speed.

In other words, it is possible to provide a circuit able to quickly protect the light-element lines.

Here, if the set value providing unit were to be configured using hardware (resistors, switches, etc., for example) and the specifications of the current control element were modified, then there is a possibility that the parts included among the hardware need to be changed based on the modification of the specifications.

However, the above-mentioned set value providing unit can be made to match the modification in specifications by a simpler operation such as updating the conversion table by communication or by direct input, for example.

In other words, it is possible to provide an easy to operate circuit.

Also, in a circuit according to one aspect of the present invention, the set value may be a value representing resistance.

In a general use current control element (an LED driving IC or the like), a current control terminal controlling the current by the resistance value is provided, and there are cases in which it is necessary to input (provide) the set value based on the resistance value.

According to the configuration above, the set value providing unit can appropriately provide the set value even if it is necessary for the current control element to provide the set value based on the resistance value.

In other words, it is possible to provide a circuit able to use a general use current control element.

Also, a circuit (LED driver circuit 3) according to one aspect of the present invention is a circuit, including: a plurality of light-element lines connected to each other in parallel; a voltage control element (general use LED driving IC 101a) that controls a potential difference; and current compensation lines connected in parallel to each of the light-element lines, each of the light-element lines including a light-emitting portion and a detection unit connected in series to the light-emitting portion and detecting a circuit state of the light-element line, each of the current compensation lines including a resistor having approximately the same resistance as the light-emitting portion included in the light-element line corresponding to each of the current compensation lines, and a switch that is connected in series to the resistor and switches the circuit state of each of the current compensation lines, the switch switching the current compensation line to be non-open if the circuit state detected by the detection unit included in the light-element line corresponding to the current compensation line including the switch is open, the switch switching the current compensation line to be open if the circuit state is non-open.

According to the configuration above, if the light-element line is open, no current flows in the light-element line. The detection unit included in the light-element line detects that the light-element line is open, and the switch included in the current compensation line corresponding to the light-element line switches the current compensation line so as to be non-open. As a result, a potential difference occurs in the resistors included in the current compensation lines, resulting in current flowing in the current compensation lines.

The resistors have approximately the same resistance as the light-emitting portions included in the light-element lines corresponding to the current compensation lines. In this manner, the current flowing in the current compensation line has approximately the same value as the current flowing in the light-element line corresponding to the current compensation line when the light-element line is non-open.

"Approximately the same resistance" means that the resistance values need not necessarily be the same. Furthermore, this means that the resistance may fluctuate due to some reason.

The current flowing through the resistor and the current compensation line when a potential difference occurs in the resistor can fluctuate due to degradation of components or the resistor itself in the circuit over time or the environment in which the circuit is placed, for example (here, environment may refer to temperature, humidity, or the like, for example). However, as long as the current does not exceed the absolute maximum rating for current of the light-emitting portion included in the light-element line or the current is within a range that does not result in damage to the light-element line, this fluctuation can be said to be within an allowable range, and the current values can be said to be approximately the same. The resistor and the resistance can allow for such fluctuation.

As a result, even if the light-element line is open, the current having approximately the same value as when the light-element line is non-open is supplied from the current compensation line to the circuit.

If the circuit does not include current compensation lines and if any of the plurality of light-element lines is open, then the sum of the currents flowing in the circuit decreases. Unlike the current control element, the voltage control element does not monitor the current flowing in the circuit, which can result in changes in current preventing normal operation. This can result in damage to the light-element lines.

However, the circuit includes the current compensation line, and thus, even without current control, the sum of the currents flowing in the circuit can be maintained at a substantially constant value, and the light-element lines can be protected from such damage.

Also, if the light-element line is non-open (operating normally), then the corresponding current compensation line is open, and therefore, no power is consumed except for when light is emitted from the light-emitting portion.

In other words, it is possible to provide a circuit, in which the potential difference is controlled, able to protect the light-element lines and having low power consumption.

The circuit according to one aspect of the present invention may be configured such that the detection unit includes a resistor connected in series to the light-element line; if there is no voltage drop at the resistor, then the detection unit detects that the light-element line including this detection unit is open, and if there is a voltage drop, then the detection unit detects that the light-element line is non-open.

According to the configuration above, it is possible to detect the circuit state of the light-element line by a detection unit constituted of resistors and having a simple structure.

In other words, it is possible to provide a low cost circuit.

Also, in a circuit according to one aspect of the present invention, a computer can be made to function as a conversion unit by a control program. Furthermore, by storing the control program in a computer-readable storage medium, it is possible to execute the control program in a general use computer.

<Additional Notes>

The present invention is not limited to the embodiments described above, and various modifications can be made without departing from the scope of the claims. Therefore, embodiments obtained by appropriately combining the techniques disclosed in different embodiments are included in the technical scope of the present invention.

<Example of Using Software>

Lastly, the converter 221 included in the set value providing part 22b may be realized as hardware using logic circuits formed on an integrated circuit (IC chip), or as software using a CPU (central processing unit).

In the case of the latter, the set value providing part 22b is provided with a CPU that executes commands of a program that realizes each function, a ROM (read only memory) that stores the program, RAM (random access memory) that loads the program, and a storage device such as a memory that stores the program and various data. Therefore, an object of the present invention can be achieved by providing the set value providing part 22b with a storage medium that stores programming code (executable program, intermediate code program, source program) of the control program of the set value providing part 22b so as to be readable by a computer, the control program being software that realizes the above-mentioned functions, and by the computer (or CPU or MPU) reading, and executing the programming code stored in the storage medium.

The storage media can be a non-transitory storage medium such as tapes including magnetic tapes and cassette tapes; magnetic disks such as a floppy (registered trademark) disk or a hard disk; discs including optical discs such as CD-ROMs, MOs, MDs, DVDs, and CD-Rs; cards such as an IC card (includes memory cards) or an optical card; semiconductor memories such as a mask ROM, an EPROM, an EEPROM, or a flash ROM; or logic circuits such as a PLD (programmable logic device) or FPGA (field programmable gate array).

Also, the above-mentioned programming code can be sent through a communication network by configuring the set value providing part 22b to be able to connect to a communication network. As long as the communication network can send the programming code, there are no limits to what can be used. The internet, intranet, extranet, LAN, ISDN, VAN, CATV network, virtual private network, telephone network, cellular line, satellite communication network, and the like can be used, for example. Also, as long as the transmission medium that constitutes the communication network can send the programming code, the transmission medium is not limited to a particular configuration or type. Wired connections such as IEEE1394, USB, power-line carrier, cable television line, telephone line, ADSL (asymmetrical digital subscriber line); infrared connections such as IrDA or remote controls; or wireless connections such as Bluetooth (registered trademark), IEEE 802.11 wireless, HDR (high data rate), NFC (near field communication), DLNA (Digital Living Network Alliance) (registered trademark), a mobile phone network, a satellite connection, or a terrestrial digital network can be used. Also, the present invention can be realized as a computer data signal embedded in a carrier wave in which the above-mentioned programming code is realized in the electronic transmission.

The present invention is not limited to the embodiments described above, and various modifications can be made without departing from the scope of the claims. Therefore, embodiments obtained by appropriately combining the techniques disclosed in different embodiments are included in the technical scope of the present invention. Furthermore, by combining techniques disclosed in the respective embodiments, it is possible to form new technical characteristics.

INDUSTRIAL APPLICABILITY

The present invention can be widely used in display devices using LEDs as the light source. Also, the present invention can be used in general for light-emitting devices in which many light-emitting elements are simultaneously driven.

DESCRIPTION OF REFERENCE CHARACTERS

1 LED driver circuit (circuit)
2 LED driver circuit (circuit)
3 LED driver circuit (circuit)
10 light-emitting module
10a light-emitting module
22a set value providing part (set value providing unit)
22b set value providing part (set value providing unit)
101 general use LED driving IC (current control element)
101a general use LED driving IC (voltage control element)
221 converter (conversion unit)
CI1 current compensation line
CI2 current compensation line
D conversion table
ES1 light-emitting portion
ES2 light-emitting portion
I1 current
I2 current
Iall current
L1 light-element line
L2 light-element line
R resistor
R1 resistor
R2 resistor
S1 fixed current source
S2 fixed current source
SC1 open-circuit detection circuit (detection unit)
SC2 open-circuit detection circuit (detection unit)
SR1 resistor
SR2 resistor
SW switch
SW1 switch
SW2 switch

What is claimed is:

1. A circuit, comprising:
a plurality of light-element lines connected to each other in parallel;
a current control element that controls a sum of current flowing through the light-element lines so as to be at a constant value; and
current compensation lines connected in parallel to the respective light-element lines,
wherein each of the light-element lines includes:
a light-emitting portion; and
a detection unit connected in series to the light-emitting portion and detecting an open/closed state of the light-element line,
wherein each of the current compensation lines includes:
a fixed current source that, when the light-element line that is coupled to the current compensation line is closed, generates a current at approximately the same value as a current flowing through said light-element line; and a switch that is connected in series to the fixed current source and switches the open/closed state of the current compensation line, wherein the switch closes the current compensation line so that said current compensation line is electrically connected in parallel to the corresponding light-element line coupled thereto when the detection unit of said light-element line detects that the light-element line is open, and opens the current compensation line so as not to be electrically connected in parallel to the light-element line when the light-element line is detected as closed.

2. The circuit according to claim 1, wherein each of the detection units includes a resistor connected in series to the respective light-element lines, and wherein each of the detection units detects that the light-element line including said detection unit is open if there is no voltage drop at the resistor, and detects that said light-element line is closed if there is a voltage drop at the resistor.

3. A circuit, comprising:

a plurality of light-element lines connected to each other in parallel;

a current control element that controls a sum of current flowing through said circuit so as to match a variable target value; and a set value providing unit providing a set value to the current control element, wherein each of the light-element lines includes:
  a light-emitting portion; and
  a detection unit connected in series to the light-emitting portion and detecting an open/closed state of the light-element line, wherein the set value providing unit generates the set value for each combination of open/closed states of the plurality of light-element lines detected by the detection unit, wherein the current control element generates the target value for each said generated set value, and wherein said generated target value is a value obtained by subtracting, from the value prior to being generated, the sum of current flowing in the light-element lines when the light-element lines previously detected as open are closed.

4. The circuit according to claim 3, wherein the set value providing unit includes a plurality of resistors and a switch that switches and combines the plurality of resistors, wherein the switch is switched for each combination of open/closed states of the plurality of light-element lines detected by the detection unit, and wherein the set value is a resistance of the set value providing unit.

5. The circuit according to claim 3, wherein the set value providing unit includes a memory storing a conversion table indicating a relation between the open/closed states detected by the detection unit and the set values, and a converter that refers to the conversion table and converts the open/closed states detected by the detection unit to the set values.

6. The circuit according to claim 5, wherein the set value is a value representing resistance.

7. A circuit, comprising:

a plurality of light-element lines connected to each other in parallel;

a voltage control element that controls a potential difference; and current compensation lines connected in parallel to the respective light-element lines, wherein each of the light-element lines includes:
  a light-emitting portion; and
  a detection unit connected in series to the light-emitting portion and detecting an open/closed state of the light-element line, wherein each of the current compensation lines includes:
  a resistor having approximately the same resistance as the light-emitting portion of the light-element line coupled to the corresponding current compensation line, and
  a switch that is connected in series to said resistor and switches the open/closed state of the current compensation line, wherein the switch closes the current compensation line so that said current compensation line is electrically connected in parallel to the corresponding light-element line coupled thereto when the detection unit of said light-element line detects that the light-element line is open, and opens the current compensation line so as not to be electrically connected in parallel to the light-element line when the light-element line is detected as closed.

* * * * *